United States Patent
Smith

(10) Patent No.: US 9,285,983 B2
(45) Date of Patent: Mar. 15, 2016

(54) GESTURE RECOGNITION USING NEURAL NETWORKS

(75) Inventor: George C. Smith, Grapevine, TX (US)

(73) Assignee: AMX LLC, Richardson, TX (US)

( * ) Notice: Subject to any disclaimer, the term of this patent is extended or adjusted under 35 U.S.C. 154(b) by 859 days.

(21) Appl. No.: 13/159,458

(22) Filed: Jun. 14, 2011

(65) Prior Publication Data

US 2011/0304573 A1   Dec. 15, 2011

Related U.S. Application Data

(60) Provisional application No. 61/354,456, filed on Jun. 14, 2010.

(51) Int. Cl.
*G06F 3/0488* (2013.01)
*G06K 9/00* (2006.01)

(52) U.S. Cl.
CPC .. *G06F 3/04883* (2013.01); *G06F 2203/04808* (2013.01); *G06K 9/00416* (2013.01); *G06K 2209/01* (2013.01)

(58) Field of Classification Search
CPC ....... G06F 3/045; G06F 3/017; G06F 3/0488; G06F 3/04883; G06F 2203/04808; G06F 9/00416; G06F 9/00429; G06F 9/00335; G06F 9/00402; G06F 9/342; G06F 9/44; G06F 2209/01
USPC ...................... 345/156, 173–174, 16, 17, 428; 715/863; 382/103, 124, 159–161, 199, 382/186–187, 202–203, 156, 173
See application file for complete search history.

(56) References Cited

U.S. PATENT DOCUMENTS

| | | | | |
|---|---|---|---|---|
| 4,972,496 A * | 11/1990 | Sklarew | ................. | G06F 3/033 345/178 |
| 5,157,737 A * | 10/1992 | Sklarew | ................. | G06F 3/033 345/173 |
| 5,287,415 A * | 2/1994 | Chefalas | ............. | G06K 9/6206 382/187 |
| 5,343,537 A * | 8/1994 | Bellegarda | ........... | G06K 9/6217 382/186 |
| 5,563,959 A * | 10/1996 | Gallo et al. | ................... | 382/187 |
| 5,570,113 A * | 10/1996 | Zetts | ................... | G06F 3/04883 345/156 |
| 5,577,135 A * | 11/1996 | Grajski | ................ | G06K 9/6218 382/187 |
| 5,583,946 A * | 12/1996 | Gourdol | ........................ | 382/187 |
| 5,740,273 A * | 4/1998 | Parthasarathy | .... | G06K 9/00416 382/186 |
| 6,104,833 A * | 8/2000 | Naoi | .................... | G06K 9/6807 382/177 |
| 6,912,310 B1 * | 6/2005 | Park | ......................... | G06K 9/32 375/E7.081 |

(Continued)

OTHER PUBLICATIONS

Boukreev, Konstantin, "Mouse Gestures Recognition", Website, http://www.codeproject.com/KB/system/gestureapp.aspx?display=print, Nov. 22, 2001.

(Continued)

*Primary Examiner* — Matthew Fry

(57) ABSTRACT

An apparatus, method, and a computer program is provided for gesture recognition using neural networks. An initial point is recorded when a user presses a finger on a screen. Subsequent points are recorded and an angle is calculated from point to point as the user periodically moves the finger. A set of the calculated angles are compared with an ideal angle in order to recognize the gesture.

15 Claims, 14 Drawing Sheets

(56) References Cited

U.S. PATENT DOCUMENTS

| | | | |
|---|---|---|---|
| 2004/0233197 A1* | 11/2004 | Liu | G06T 11/203 345/442 |
| 2005/0046621 A1* | 3/2005 | Kaikuranta | G06F 3/03547 345/173 |
| 2007/0162241 A1* | 7/2007 | Yuan | G05B 19/4065 702/81 |
| 2008/0192005 A1* | 8/2008 | Elgoyhen | G06F 3/014 345/158 |
| 2010/0128985 A1* | 5/2010 | El-Sana | G06K 9/00402 382/189 |
| 2010/0283742 A1* | 11/2010 | Lam | 345/173 |
| 2011/0102464 A1* | 5/2011 | Godavari | G06F 3/0416 345/650 |
| 2011/0145238 A1* | 6/2011 | Stork | G06K 9/6219 707/737 |

OTHER PUBLICATIONS

Kendall, Graham, "Introduction to Artificial Intelligence", The University of Nottingham, School of Computer Science & IT, Sep. 21, 2001.

McCollum, Pete, "An Introduction to Back-Propagation Neural Networks", Website, http://www.seattlerobotics.org/encoder/nov98/neural.html, Nov. 1998.

Nissen, Steffen, "Neural Network Theory", Website, http://leenissen.dk/fann/report/node4.html, Nov. 7, 2003.

* cited by examiner

AND FUNCTION

OR FUNCTION

500

XOR FUNCTION

GESTURE RECOGNITION USING NEURAL NETWORKS

CROSS-REFERENCE TO RELATED APPLICATION

This application claims the benefit of U.S. Provisional Patent Application No. 61/354,456, filed on Jun. 14, 2010. The subject matter of the earlier filed application is hereby incorporated by reference in its entirety.

FIELD

The present invention relates to gesture recognition and, more particularly, to gesture recognition using neural networks.

BACKGROUND

A gesture is a motion of a figure or stylus across a touch panel's liquid crystal display (LCD) screen. The gesture can also be a motion of a mouse either directly connected to the panel or connected through a virtual network computing (VNC) session.

Touch panels currently use resistive touch panel overlays. The resistive touch panel overlays can only detect a single touch at a time. Devices such as the iPhone® use capacitive technology that detects multiple touch points and, thus, enable their much lauded pinch and zoom capabilities.

SUMMARY

Certain embodiments of the present invention may provide solutions to the problems and needs in the art that have not yet been fully identified, appreciated, or solved by current gesture recognition apparatuses, methods, and computer programs.

In accordance with an embodiment of the present invention, a computer-implemented method is provided. The method includes recording an initial point when a user presses a finger on a screen. The method also includes recording subsequent points and calculating an angle from point to point as the user periodically moves the finger. The method further includes comparing a set of the calculated angles with an ideal angle in order to recognize the gesture.

In accordance with another embodiment of the present invention, an apparatus is provided. The apparatus includes a processor and memory configured to store an application. The application, when executed, is configured to cause the processor to record an initial point when a user presses a finger on a screen. The application is further configured to cause the processor to record subsequent points and calculate an angle from point to point as the user periodically moves the finger. The application is further configured to cause the processor to compare a set of the calculated angles with an ideal angle in order to recognize the gesture.

In accordance with yet another embodiment of the present invention, a computer program is provided. The computer program is embodied on a non-transitory computer-readable medium and, when executed, is configured to cause a processor to record an initial point when a user presses a finger on a screen, as well as record subsequent points and calculate an angle from point to point as the user periodically moves the finger. The processor also compares a set of the calculated angles with an ideal angle in order to recognize the gesture.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein pertain to an apparatus, method, and/or computer program that processes user touch points so that gestures can be recognized and used on touch panels. One or more embodiments described herein also pertain to an apparatus, method, and/or computer program that simulates multi-touch actions on a resistive overlay.

The apparatus, method and/or computer program is configured to distinguish between lines, circles and more complex motions when gesturing on a touch screen. The apparatus, method and/or computer program is also configured to simulate pinch, zoom and rotate on a resistive overlay, as well as user-defined gestures and actions.

The apparatus, method and/or computer program is simple, reliable and robust, and allows users to define their own gestures. The apparatus, method and/or computer program also allows other system control operations such as volume control besides manipulating graphics on a screen. Simulate multi-touch actions can also be achieved on a less expensive resistive overlay.

Figure 1:
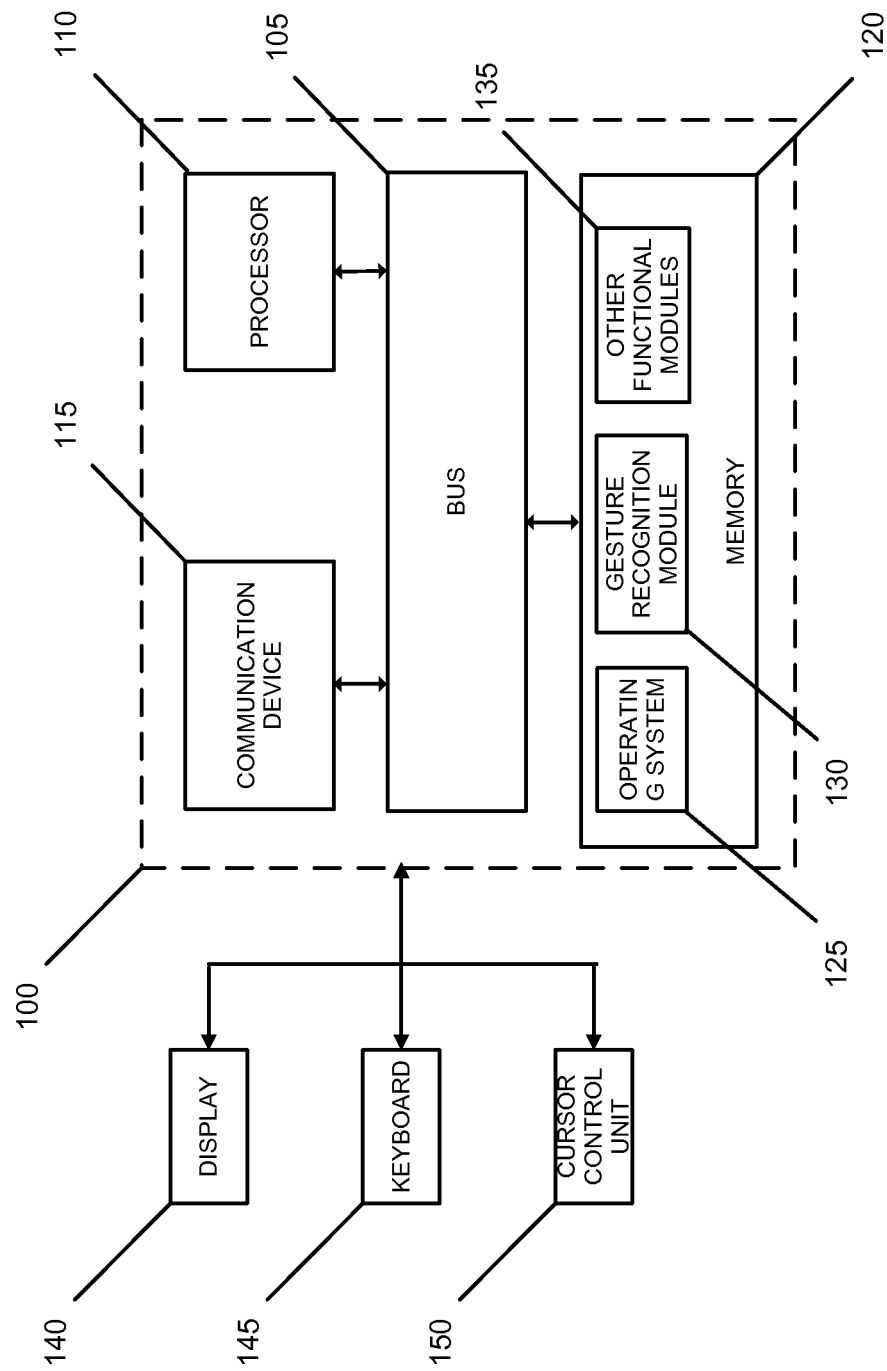
FIG. 1 illustrates a block diagram of a system that can be implemented in one or more embodiments of the present invention.

FIG. 1 illustrates a block diagram of a system 100 that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include memory 120 that can store information and instructions to be executed by processor 110. Memory 120 can be comprised of any combination of random access memory ("RAM"), read only memory ("ROM"), static storage such as a magnetic or optical disk, or any other type of non-transitory computer readable medium. System 100 may also include a communication device 115, such as a network interface card, that may provide access to a network.

The computer readable medium may be any available media that can be accessed by processor 110. The computer readable medium may include both volatile and nonvolatile medium, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a gesture recognition module 130, as well as other functional modules 135. Operating system 125 may provide operating system functionality for system 100. Because system 100 may be part of a larger system, system 100 may include one or more additional functional modules 135 to include the additional functionality.

Figure 2:
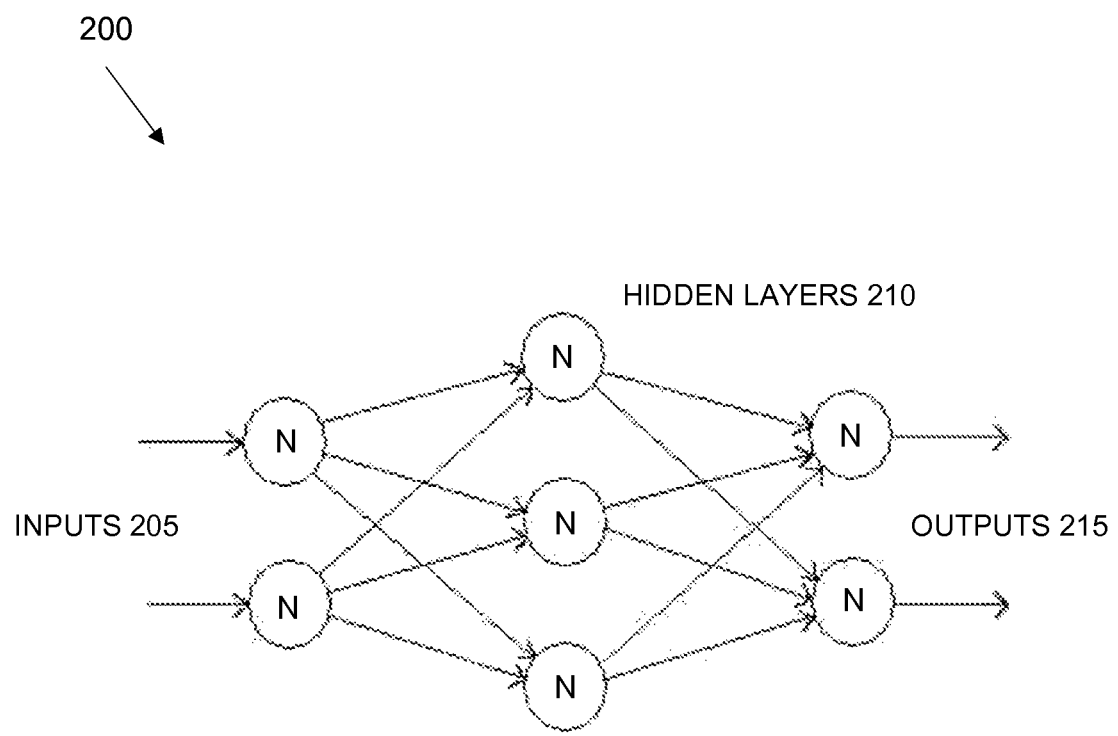
FIG. 2 illustrates a neural net, in accordance with an embodiment of the present invention.

FIG. 2 illustrates a neural net 200, in accordance with an embodiment of the present invention. A neural net is a simplified simulation of the way biological neurons work. The neural network can be a device that emulates the human brain. For instance, imagine an electrical device that had a transfer function that mimicked a biological neuron and was connected to other neurons using resistance, inductance, and capacitive (RLC) circuits that closely approximated real electro-chemical connections. This would be a good approximation of biology but presents two problems to engineers. The first problem would be that it is extremely complex to implement and the second problem is that it would be even harder to "train" the system to do anything useful.

In order to overcome this problem, FIG. 2 illustrates a change to the design so that neurons N can be arranged in layers. For instance, the first layer is an input layer 205 that would represent synapses (dendrites). FIG. 2 also illustrates one or more hidden (middle) layers 210 that are simply neurons N. Finally, there is an output layer 210 of axons. Every neuron N in a given layer is connected to every neuron N in the next layer. See FIG. 2. Signals are defined to only flow in one direction, i.e., from input layer 205 toward output layer 215. This can be known as a feed-forward network.

Next, the neuron N can be configured as an adder with an analog comparator. The comparator can be set with a threshold that triggers the output once the threshold is reached. The final simplification is to configure the connections as simple resistors that weight the inputs to the adders.

To summarize the functionality, each neuron has an input that represents the output of each neuron in the previous layer with each of those signals being multiplied by a separate weight. The weighted inputs are added together and passed through a threshold function, which triggers the output of the neuron. The neuron output is limited so as not to overload the neurons in the next layer. The output of the limiter is connected to the input of every neuron in the next layer. This process is repeated for each of the layers in the network.

Figure 3:
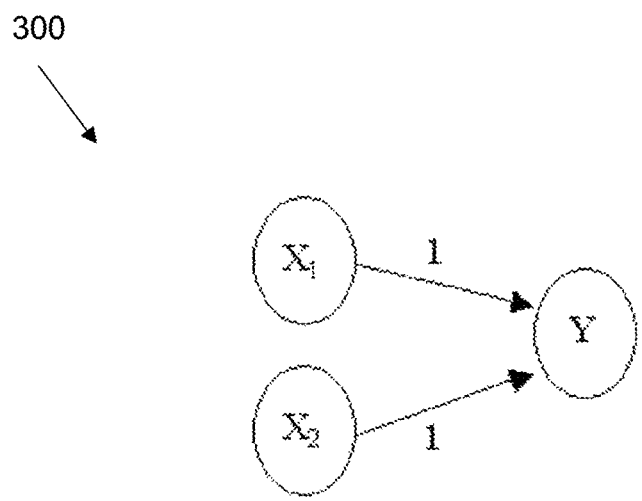
FIG. 3 illustrates a neural net that simulates an AND gate, in accordance with an embodiment of the present invention.

FIG. 3 illustrates a neural net 300 that simulates an AND gate, in accordance with an embodiment of the present invention. In FIG. 3, the weight on each input is set to 1 and the threshold for Y is set to 2. When both $X_1$ and $X_2$ are activated, the adder will sum the inputs getting a value of 2. Since this matches the threshold, the output will be activated. If the output value is limited to 1, the logic matches an AND gate.

Figure 4:
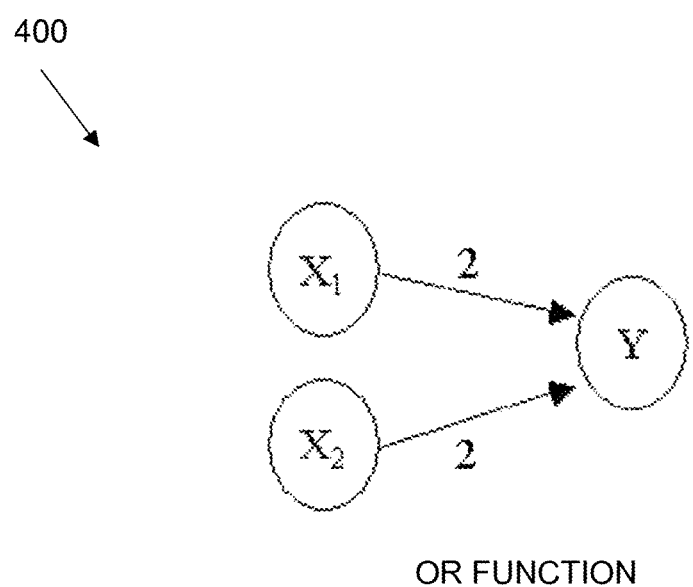
FIG. 4 illustrates a neural net that simulates an OR gate, in accordance with an embodiment of the present invention.

FIG. 4 illustrates a neural net 400 that simulates an OR gate, in accordance with an embodiment of the present invention. In order to model an OR gate, the Y activation threshold is set at 2, but the weights on each input is changed to 2.

Figure 5:
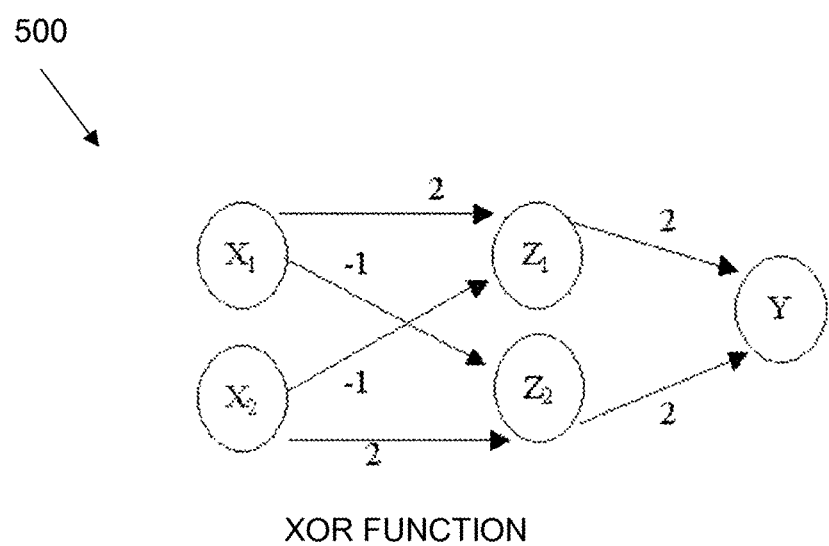
FIG. 5 illustrates a neutral net that simulates an XOR gate, in accordance with an embodiment of the present invention.

FIG. 5 illustrates a neutral net 500 that simulates an XOR gate, in accordance with an embodiment of the present invention. For an XOR gate, $Z_1$, $Z_2$ and Y thresholds are all set at 2.

A neural net is beneficial for complex problem such as recognizing the difference between a line and a circle drawn by the user on a panel's touch screen. For instance, neural nets simply require training, while traditional software techniques require that all the inputs, the algorithms and the outputs be known.

One aspect of a neural net is the table of weights and the values in each position. For instance, if we had the correct weights in each position, for a given set of inputs we would get the expected output. Adjusting the weights is called training the network. The most commonly implemented training method is called back propagation.

Figure 6:
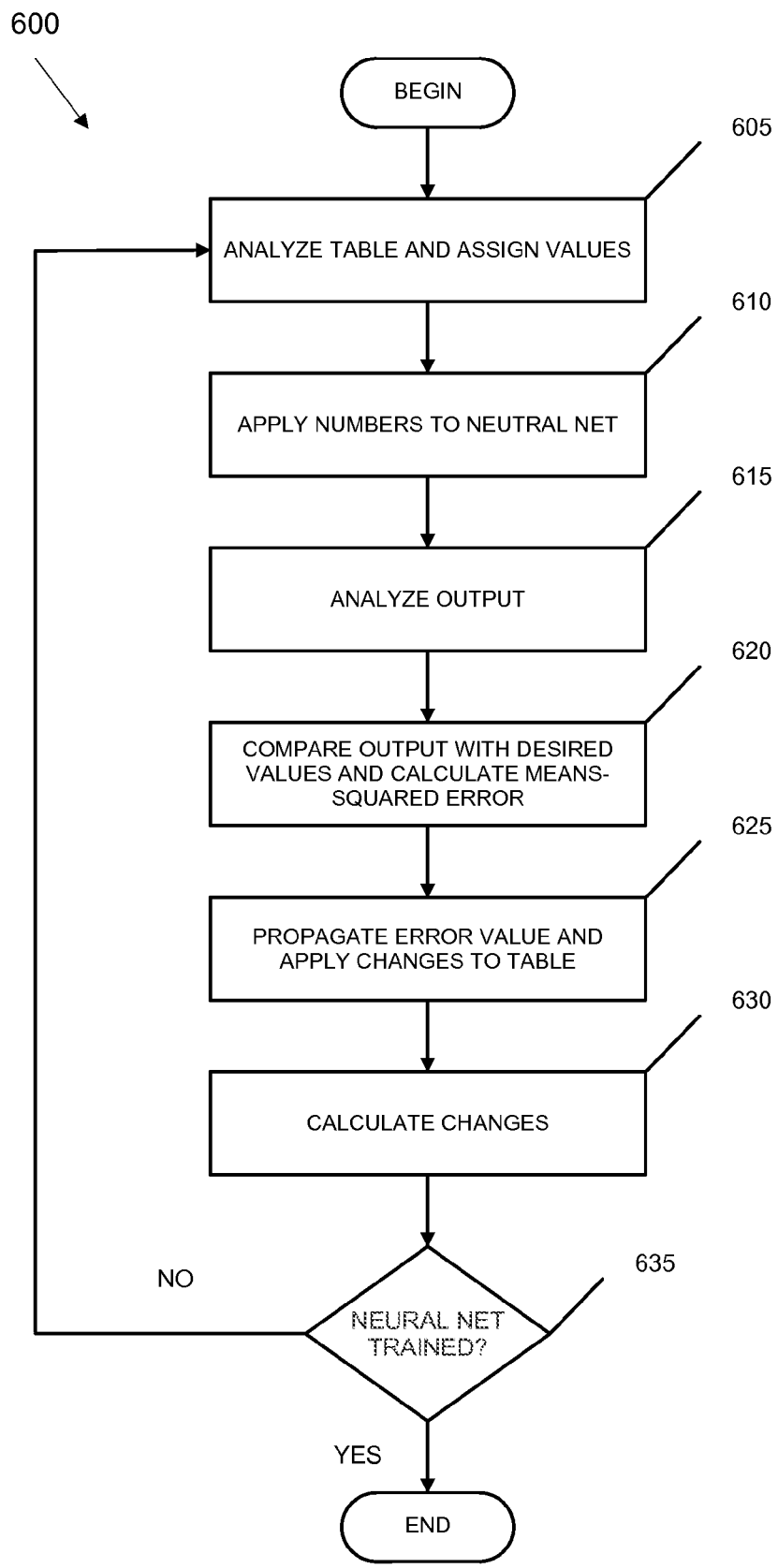
FIG. 6 illustrates a method that trains a neural net, in accordance with an embodiment of the present invention.

FIG. 6 illustrates a method 600 that trains a neural net, in accordance with an embodiment of the present invention. Typically, all of the numbers in neural net implementations are normalized to values between −1.0 and 1.0 or sometimes 0.0 to 1.0. At 605, the weighting tables are analyzed and random values are assigned in the range of −1.0 and 1.0, or sometimes 0.0 to 1.0. At 610, input numbers are applied to the neural net and the output is analyzed at 615. It should be appreciated that the first time the output is going to be random (and may be incorrect). The output is compared with a desired output and a mean-squared error value is calculated at 620. At 625, the error value is propagated backwards through the neural net and small changes are applied to the weights tables in each layer. The changes are calculated at 630 so that the error signal for this particular input set is reduced. If the neural net is not considered to be "trained" at 635, then the cycle is repeated for every set of numbers on the input side until the error value drops below a value where the network can be considered to be "trained."

Figure 7:
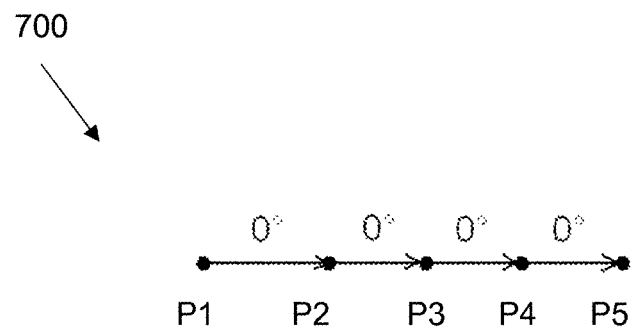
FIG. 7 illustrates a gesture from left to right, in accordance with an embodiment of the present invention.

FIG. 7 illustrates a gesture from left to right, in accordance with an embodiment of the present invention.

In this embodiment, assume that 5 touch points P1-P5 are collected: an x and y value when a user first touches the screen, three x and y values as the user moves and finally an x and y value when the user releases his or her finger. The number of output axons needed would be two. By applying geometry, one can calculate the angle from one point to the next. The angles between each point are illustrated in FIG. 7.

Figure 8:
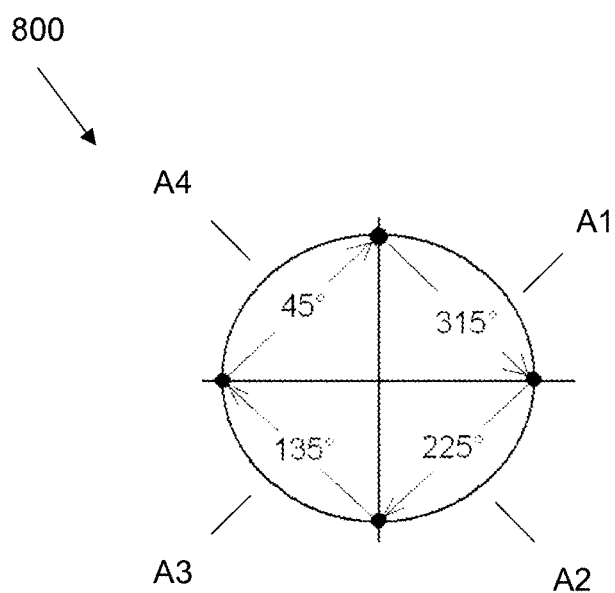
FIG. 8 illustrates a clockwise circle gesture, in accordance with an embodiment of the present invention.

FIG. 8 illustrates a clockwise circle gesture, in accordance with an embodiment of the present invention. In order to translate the gesture into input numbers, four angles A1-A4 shown in FIG. 8 are utilized as inputs and have 4 input synapses. In order to normalize angles, the sine and cosine of each angle are utilized as inputs to the neural net. In other words, 8 input synapses and 8 neurons are utilized in the middle layer. As stated above, in this example there are 2 output axons. If the inputs represent our line (see FIG. 7), the first axon may output a 1 and the second axon may output a 0. If the inputs represent our circle (see FIG. 8), then the reverse should be outputted, i.e., the first axon may output a 0 and the second axon may output a 1.

Figure 9:
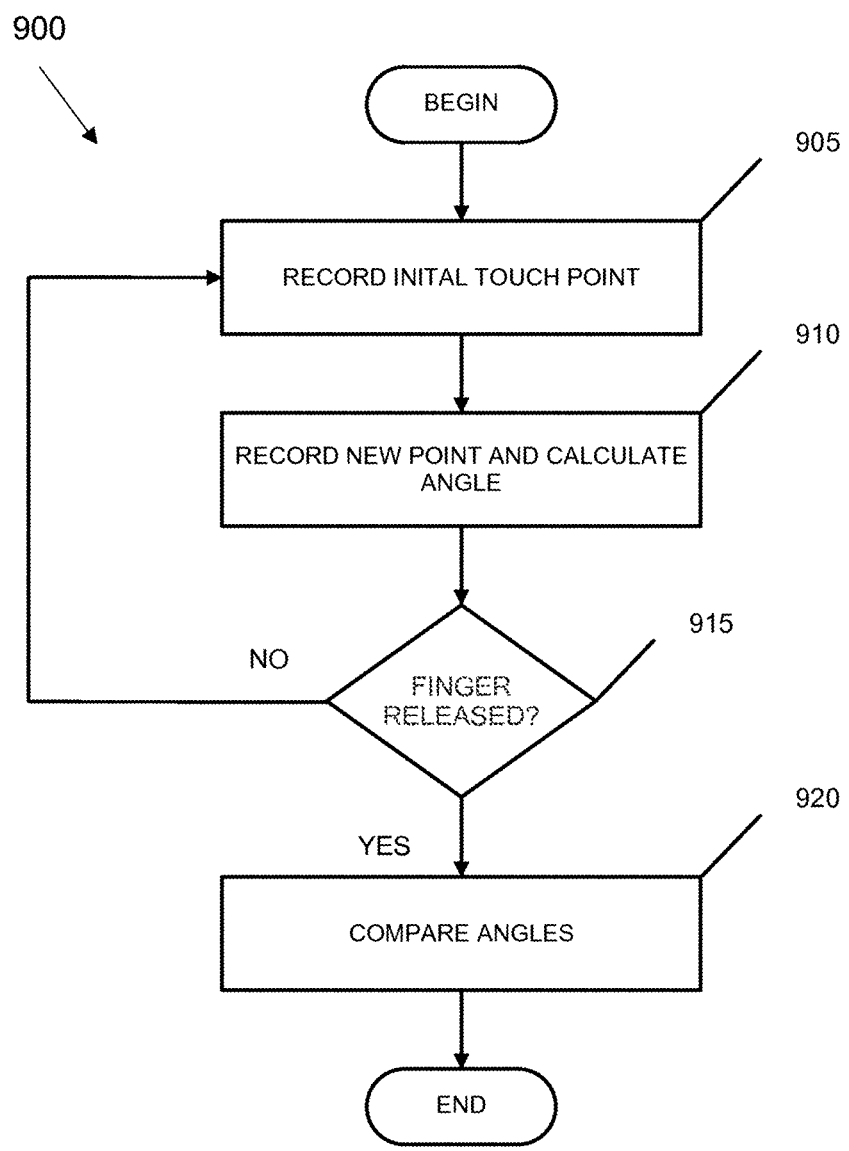
FIG. 9 illustrates a method to recognize gestures, in accordance with an embodiment of the present invention.

FIG. 9 illustrates a method 900 to recognize gestures, in accordance with an embodiment of the present invention. The gesture recognition described herein can be based on a table of ideal angles which represent the angle from one point to the next point as the user moves his or her finger across the screen. For example, this could represent an ideal line from left to right (see FIG. 7) or an ideal circle (see FIG. 8).

In order for the gesture recognition module to recognize the gesture, at 905, when a user presses their finger, an initial touch point is recorded. At 910, as the user periodically moves their finger, a new point is recorded and the angle is calculated from each point to the next point. If the user's finger is not released at 915, then the process is repeated each time the finger is moved. Once the user releases their finger, then the entire set of angles is compared at 920 to the ideal angle to "recognize" the gesture. One embodiment can be a simple lookup with an overall error for each possibility, while another embodiment can be to consider the lower error as the correct gesture.

Figure 10:
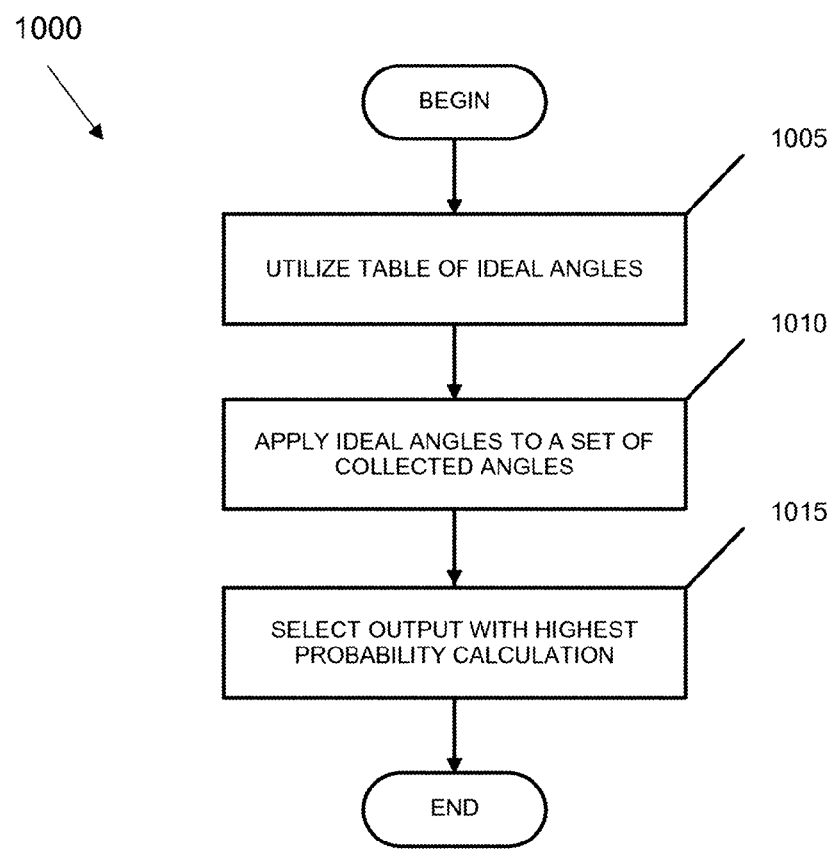
FIG. 10 illustrates a method to recognize gestures, in accordance with another embodiment of the present invention.

FIG. 10 illustrates a method 1000 to recognize gestures, in accordance with another embodiment of the present invention. At 1005, a table of ideal angles to train the software neural net is utilized and applied at 1010 to a set of collected user angles. At 1015, an output with the highest probability calculation is selected.

Figure 11:
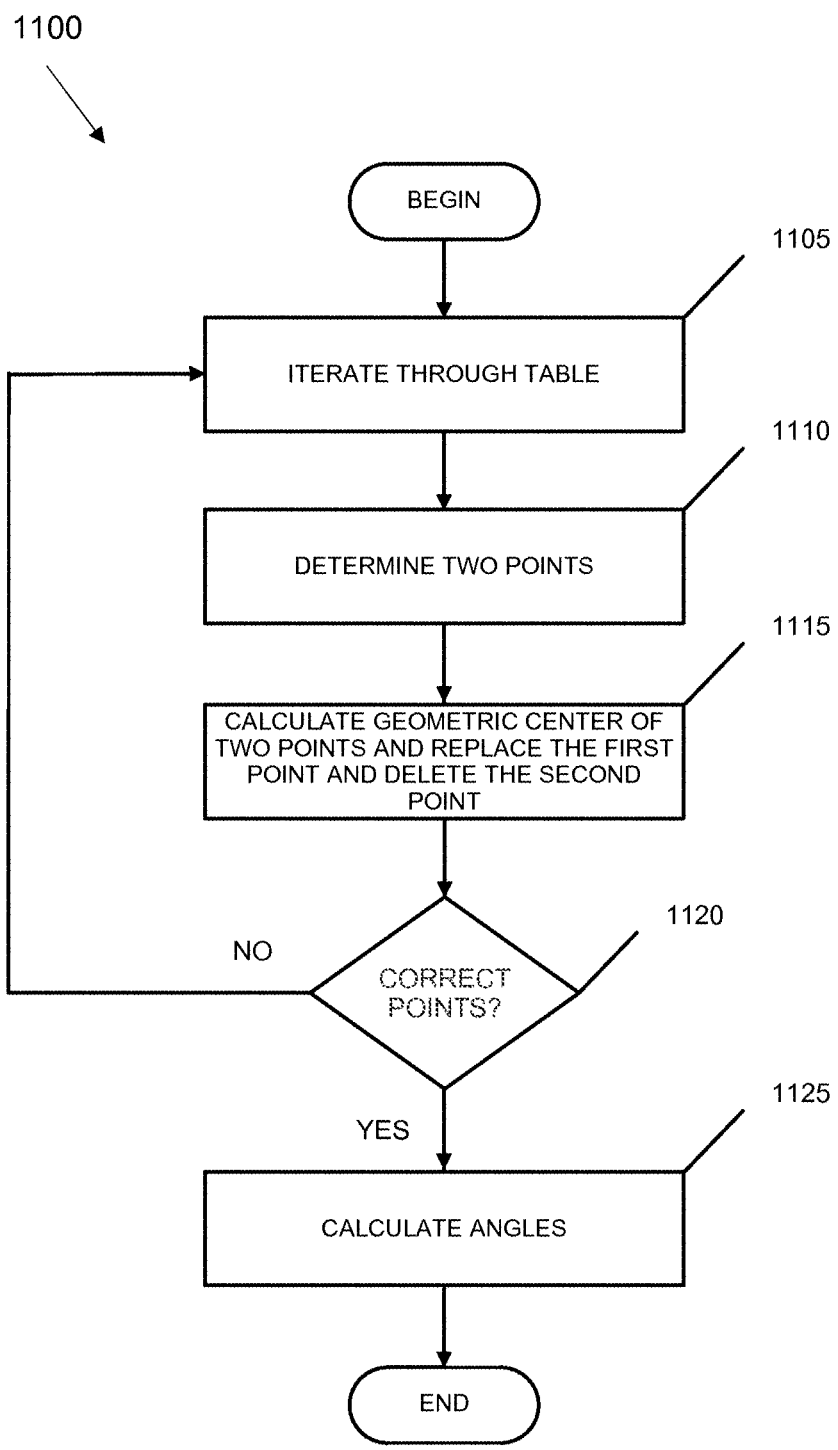
FIG. 11 illustrates a method to recognize a gesture when there are too many points, in accordance with another embodiment of the present invention.

FIG. 11 illustrates a method 1100 to recognize a gesture when there are too many points, in accordance with another embodiment of the present invention. At 1105, when there are too many points, the software neural net iterates through the table, and determines at 1110 the two points that are closest to each other. At 1115, the geometric center of these two points is calculated and the first point is replaced with this value and the second point is deleted. If the correct points are not realized at 1120, then the process is repeated. If the correct points are realized, then the angles are calculated at 1125 in order to recognize the gesture.

Figure 12:
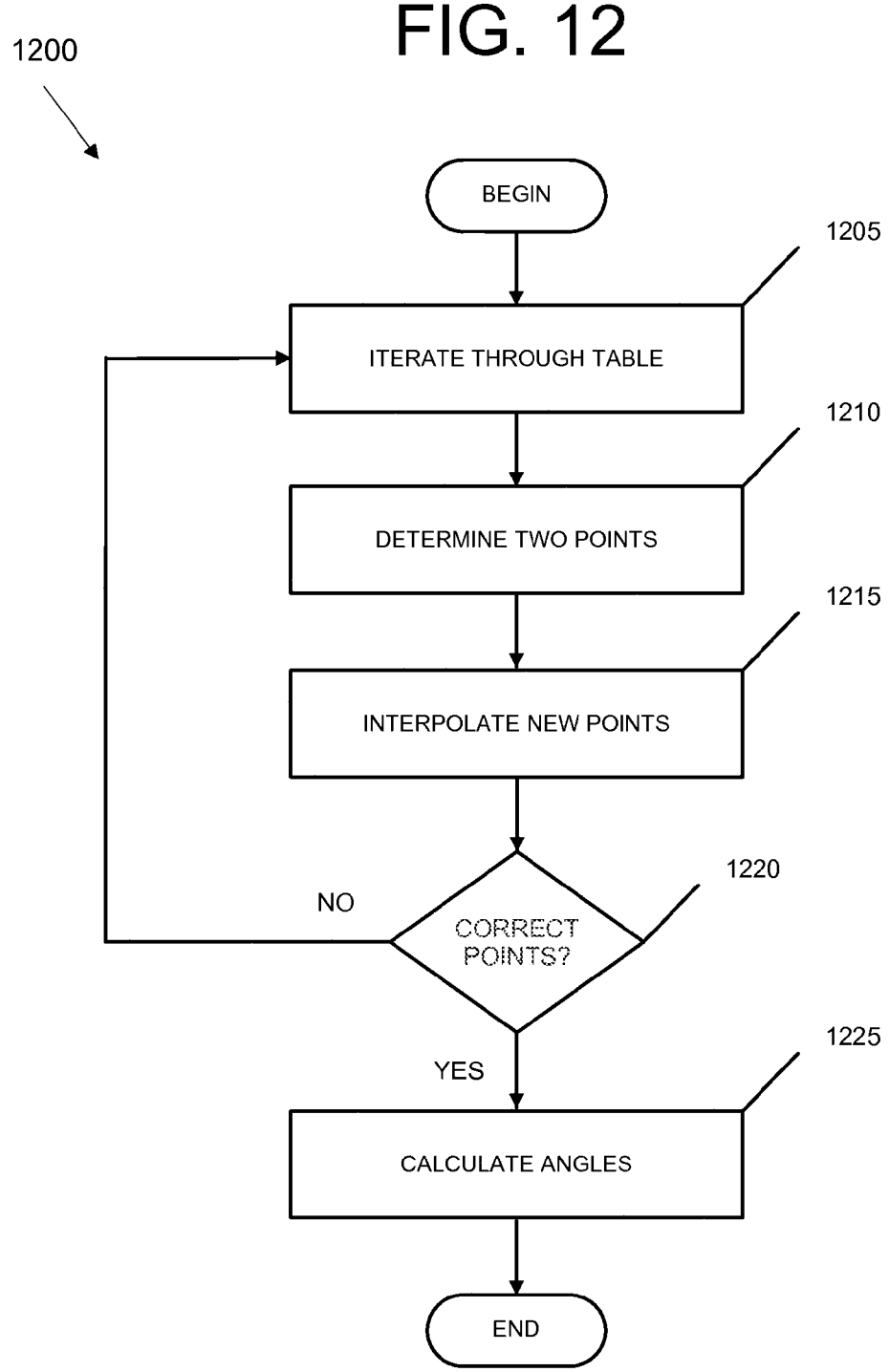
FIG. 12 illustrates a method to recognize a gesture when there are too few points, in accordance with another embodiment of the present invention.

FIG. 12 illustrates a method 1200 to recognize a gesture when there are too few points, in accordance with another embodiment of the present invention.

When a determination is made that there aren't enough points, the table is iterated through at 1205 and the two points that are farthest away from each other at determined at 1210. A new point is interpolated at 1215 between the two points, and the process is repeated until the correct number of points is realized. If the correct points are realized, then the angles are calculated at 1220 in order to recognize the gesture.

In another embodiment, if there aren't enough points, then the gesture is disregarded or a simple line (up, down, left, right) is calculated if the maximum distance between points exceeds some threshold. For example, if all the points are close together, then this can be considered a quick tap and release rather than a gesture.

For user-defined gestures, the number and type of gestures along with the table of ideal angles can be fixed. However, in an alternate embodiment, this information can be read in from storage and processed at run time to allow users to define their own gestures by changing the information in the table.

For user-defined actions on a typical device using gestures, the user can manipulate graphical objects on a screen. One or more embodiments allow the user to map a gesture to a user-defined action, which can then be propagated throughout the system to perform other control operations. For example, a user can gesture and change the channel on his or her television, turn off the lights, rewind the DVR, etc. In the embodiments described herein, each gesture can send a custom event to a user code, set a channel or a level, activate a page flip on the panel and even transmit a user's custom string or command.

For gesture velocity, the time is tracked between when a user first starts the gesture and when the user stops the gesture motion. This value is used to calculate a gesture velocity, which is then presented in a fashion that allows further customization by the user. For instance, a slow swipe could change the volume slower than a quick flick. The velocity is presented both in a simple form (slow, normal, fast) and a more precise form of pixels per second.

For simulated multi-touch style operations such as pinch, zoom and rotate, an analysis of the touch data is conducted on a resistive overlay. For instance, a user can touch the screen at a certain location with his or her finger, or touch one inch to the left and one inch to the right with two different fingers and the touch system may only detect a single touch point in the middle. These two examples would appear exactly the same to the touch system. However, if the user touches somewhere with one finger and hold that finger down, then touches again somewhere else with another finger, it may be possible to detect a "jump" and then motion as you move either finger. This allows simulation of pinch, zoom and rotate style operations until you release.

Figure 13:
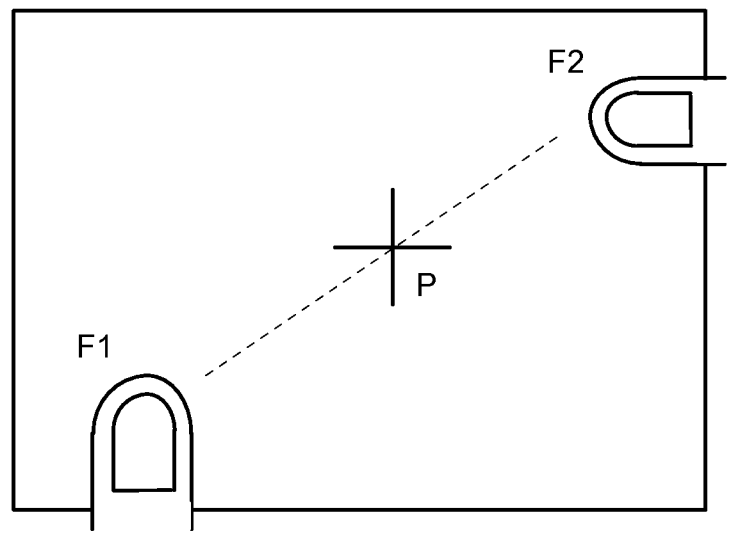
FIG. 13 illustrates a detection of a point on a screen, in accordance with an embodiment of the present invention.

FIG. 13 illustrates detection of a point on a screen, in accordance with an embodiment of the present invention. In FIG. 13, a user is holding down two figures F1, F2 on screen 1300 and a value (or point) P is realized (or detected) somewhere between the points of the two fingers.

Figure 14:
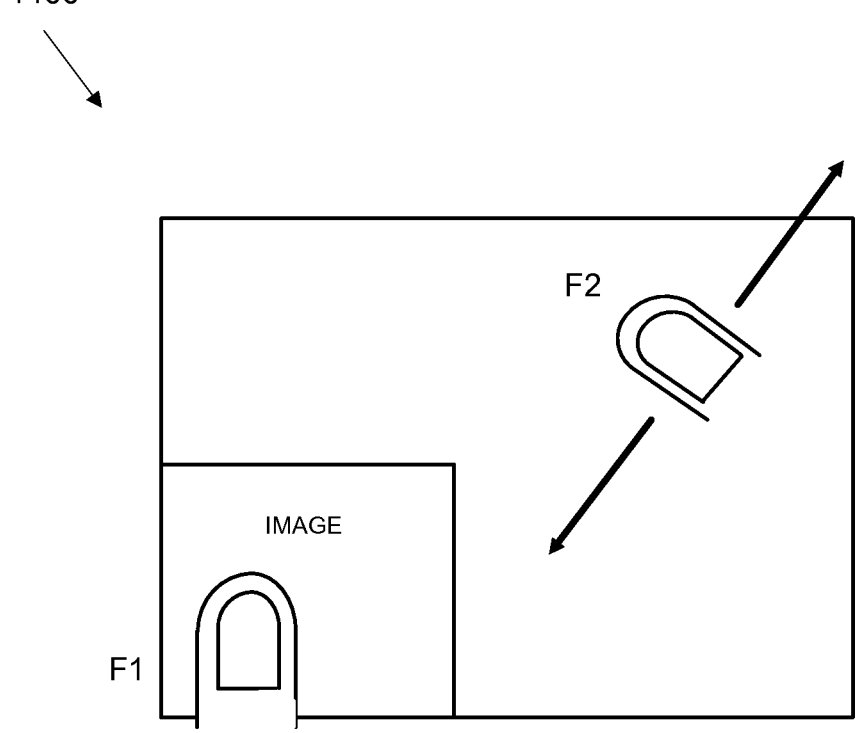
FIG. 14 illustrates a scaling of a picture on a screen, in accordance with an embodiment of the present invention.

FIG. 14 illustrates scaling of a picture on screen, in accordance with an embodiment of the present invention.

If the user touches an area on a screen 1400 with a finger F1 and holds his or her finger as an anchor, then the gesture recognition module can detect a jump and relative motion as the user moves second finger F2. The gesture recognition module can detect a large jump and relative motion as the user moves second finger F2. For instance, in order to scale a picture, the user presses and holds finger F1 in the lower left hand corner of screen 1400, and moves second finger F2 to scale.

Figure 15:
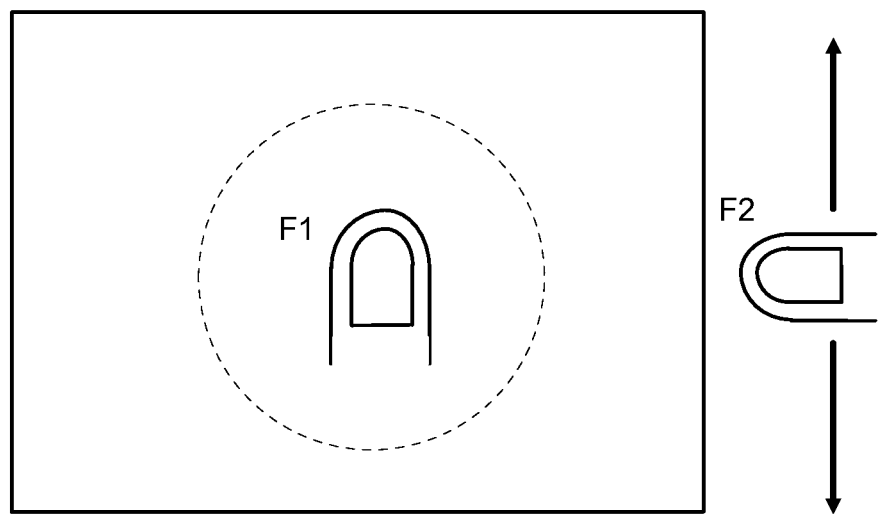
FIG. 15 illustrates a rotation of an object on a screen, in accordance with an embodiment of the present invention.

FIG. 15 illustrates a rotation of an object on a screen, in accordance with an embodiment of the present invention.

In order to rotate a picture, the gesture recognition module is configured to detect a circling gesture or an anchor gesture by a user's finger F1 on a screen 1500, and detect that the user's other finger F2 is moving up and/or down.

The method steps shown in FIGS. 6 and 9-12 may be performed, in part, by a computer program, encoding instructions for a nonlinear adaptive processor to cause at least the methods described in FIGS. 6 and 9-12 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 6 and 9-12, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for gesture recognition, comprising:
   recording an initial point when it is determined that a user presses a finger on a screen comprising a resistive touch panel overlay that can only record a single point at a time;
   recording subsequent points and calculating an angle from point to point as the user periodically moves the finger; and
   when it is determined that the user's finger is removed from the screen, comparing each of the calculated angles with corresponding ideal angles in order to recognize the gesture;
   wherein recognizing the gesture comprises:
      iterating through a table to determine two points that are closest to each other when a plurality of points exceeds a threshold number;
      calculating a geometric center value of the two points, replacing the first point with the value and deleting the second point; and
      repeating the iteration and replacing until the plurality of points is reduced to the threshold number.

2. The computer-implemented method of claim 1, further comprising:
   determining an overall error for each possibility based on the comparing of each of the calculated angles.

3. The computer-implemented method of claim 1, further comprising:
   based on the comparing of each of the calculated angles, selecting the calculated angles with the lowest error to be the correct gesture.

4. The computer implemented method of claim 1, further comprising:
   iterating through a table to determine two points that are furthest away from each other when the plurality of points are below a minimum number of points; and
   interpolating a new point between the two points.

5. The computer-implemented method of claim 1, further comprising:
   when the plurality of points are below a minimum number of points, calculating a simple line when a maximum distance between two of the plurality of points exceeds a threshold number.

6. An apparatus, comprising:
   a processor; and
   memory configured to store an application,
   wherein the application, when executed, is configured to cause the processor to:
      record an initial point when it is determined that a user presses a finger on a screen comprising a resistive touch panel overlay that can only record a single point at a time;
      record subsequent points and calculate an angle from point to point as the user periodically moves the finger; and
      when it is determined that the user's finger is removed from the screen, compare each of the calculated angles with corresponding ideal angles in order to recognize the gesture;
   wherein the processor is further configured to:
      iterate through a table to determine two points that are closest to each other when a plurality of points exceeds a threshold number;
      calculate a geometric center value of the two points, replacing the first point with the value and deleting the second point; and
      repeat the iteration and replacing until the plurality of points is reduced to the threshold number.

7. The apparatus of claim 6, wherein the application is further configured to cause the processor to:
   determine an overall error for each possibility based on the comparing of each of the calculated angles.

8. The apparatus of claim 6, wherein the application is further configured to cause the processor to:
   based on the comparing of each of the calculated angles, select the calculated angles with the lowest error to be the correct gesture.

9. The apparatus of claim 6, wherein the application is further configured to cause the processor to:
   iterate through a table to determine two points that are furthest away from each other when a plurality of points is below a minimum number of points; and
   interpolate a new point between the two points.

10. The apparatus of claim 6, wherein the application is further configured to cause the processor to:
    when the plurality of points is below a minimum number of points, calculate a simple line when a maximum distance between two of the plurality of points exceeds a threshold number.

11. A computer program, embodied on a non-transitory computer-readable medium, the computer program, when executed, configured to cause a processor to:
    record an initial point when it is determined that a user presses a finger on a screen comprising a resistive touch panel overlay that can only record a single point at a time;
    record subsequent points and calculate an angle from point to point as the user periodically moves the finger; and
    when it is determined that the user's finger is removed from the screen,
    compare each of the calculated angles with corresponding ideal angles in order to recognize the gesture;
    iterate through a table to determine two points that are closest to each other when a plurality of points exceeds a threshold number;

calculate a geometric center value of the two points, replacing the first point with the value and deleting the second point; and repeat the iteration and replacing until the plurality of points is reduced to the threshold number.

12. The computer program of claim 11, wherein the computer program is further configured to cause the processor to:

determine an overall error for each possibility based on the comparing of each of the calculated angles.

13. The computer program of claim 11, wherein the computer program is further configured to cause the processor to:

based on the comparing of each of the calculated angles, select the calculated angles with the lowest error to be the correct gesture.

14. The computer program of claim 11, wherein the computer program is further configured to cause the processor to:

iterate through a table to determine two points that are furthest away from each other when a plurality of points is below a minimum number of points; and interpolate a new point between the two points.

15. The computer program of claim 11, wherein the computer program is further configured to cause the processor to:

when the plurality of points are below a minimum number of points, calculate a simple line when maximum distance between two of the plurality of points exceeds a threshold number.

* * * * *